United States Patent [19]

Stanojevic et al.

[11] Patent Number: 4,667,265
[45] Date of Patent: May 19, 1987

[54] ADAPTIVE THERMAL SHUTDOWN CIRCUIT

[75] Inventors: Silvo Stanojevic, Milpitas; Bernard D. Miller, San Jose, both of Calif.

[73] Assignee: National Semiconductor Corporation, Santa Clara, Calif.

[21] Appl. No.: 811,791

[22] Filed: Dec. 20, 1985

[51] Int. Cl.$^4$ .............................................. H02H 5/04
[52] U.S. Cl. ...................................... 361/103; 361/87; 361/93
[58] Field of Search ............................ 361/87, 93, 103

[56] References Cited

U.S. PATENT DOCUMENTS

| | | | |
|---|---|---|---|
| 3,906,310 | 9/1975 | Esashika | 361/103 |
| 4,146,903 | 3/1979 | Dobkin | 361/103 X |
| 4,345,218 | 8/1982 | Congdon et al. | 361/103 X |
| 4,355,344 | 10/1982 | Felici et al. | 361/103 |

FOREIGN PATENT DOCUMENTS 2136232 9/1984 United Kingdom ................ 361/103

OTHER PUBLICATIONS

RCA Technical Notes, *Thermal Shutdown Circuitry*, Otto Heinrich Schade, Jr.; Mar. 2, 1981.

*Primary Examiner*—A. D. Pellinen
*Assistant Examiner*—Jeffrey A. Gaffin
*Attorney, Agent, or Firm*—Gail W. Woodward

[57] ABSTRACT

An IC thermal shutdown circuit is based upon the thermal characteristics of a reverse biased PN junction diode. The leakage current, at bias levels below breakdown, is closely related to the high temperature IC performance limit. A hysteresis introducing circuit produces reliable switching at predetermined levels to shut down the IC when the maximum temperature limit is reached.

6 Claims, 3 Drawing Figures

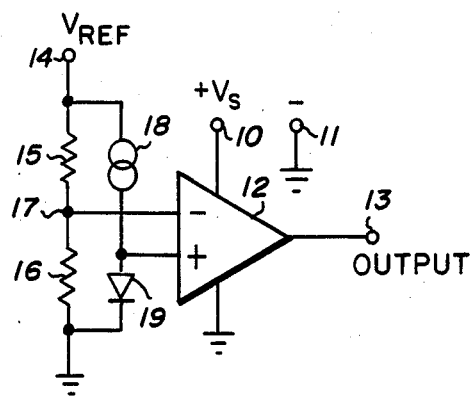
*Fig_1* (PRIOR ART)
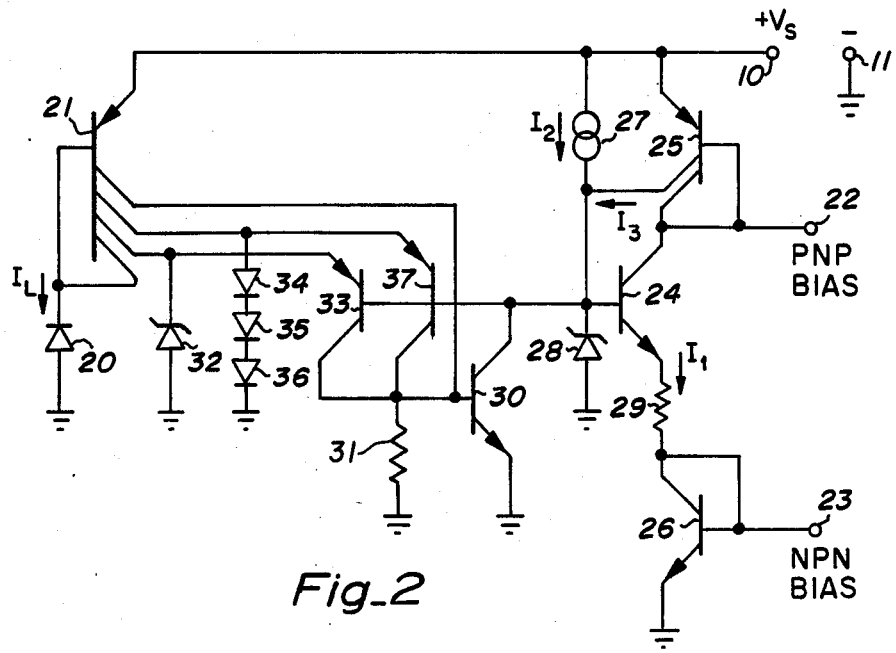
*Fig_2*
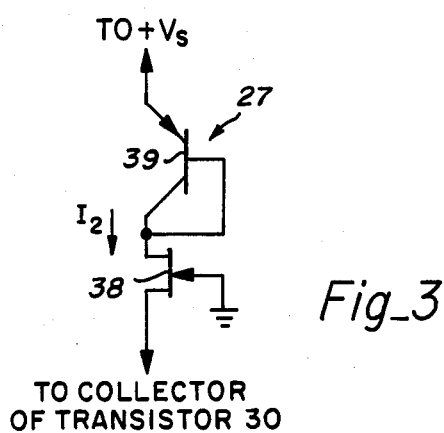
*Fig_3*

ADAPTIVE THERMAL SHUTDOWN CIRCUIT

BACKGROUND OF THE INVENTION

Integrated circuit (IC) devices can be permanently damaged by excessive temperatures. Those IC devices that can generate sufficient self heating to cause such damage are commonly provided with internal means for shutting the circuit down when its internal temperature exceeds some limiting value. Typically, an IC element that has a temperature responsive characteristic, such as the forward voltage drop across a conducting PN junction diode, is monitored and a shutdown mechanism initiated when the temperature exceeds some predetermined level.

One such system, employing the monitoring of a sense emitter in an IC power transistor, is disclosed in a copending patent application by Robert J. Widlar, Ser. No. 773,693, filed Sept. 9, 1985. Here the power transistor emitter-base potential is compared with the sense emitter to base potential.

In U.S. Pat. No. 4,345,218 to Tim D. Isbell and James S. Congdon, issued Aug. 17, 1982, a thermal shutdown circuit is based upon an excessive temperature level being exceeded. After such an excess is sensed the IC is cycled between a lower high temperature state and a substantially lower low temperature state until the overload is cleared or the circuit is turned off. Thus, the highest temperature is encountered only once. In this circuit the temperature responsive element is a zener diode in combination with an emitter follower so that the main temperature responsive element is the base to emitter voltage of a conducting transistor.

The teaching in the above citations is incorporated herein by reference.

SUMMARY OF THE INVENTION

It is an object of the invention to reverse bias a PN junction diode in an IC and, when the reverse leakage current rises above a predetermined level, in response to temperature rise, the IC is shut down.

It is a further object of the invention to sense the leakage in a reverse biased PN junction in an IC in a circuit that has a built in hysteresis at a threshold level that represents an upper temperature limit in the IC and to shut the circuit down when the threshold is exceeded.

These and other objects are achieved in a circuit configured as follows. A control circut node operates the base of a control transistor at a clamp level that normally results in an operating IC. A switching transistor is coupled across the emitter-base circuit of the control transistor. A temperature sense diode is reverse biased by the input portion of a plural output current mirror. The sense diode current, which increases with temperature, is reflected at each of the current mirror plural outputs. One output is coupled directly to the base of the switching transistor. Thus, increasing temperature will pull the switching transistor into conduction at some elevated temperature. A second current mirror output is coupled to a second clamping circuit that operates at the same clamp level as the control circuit node clamp level. A first normally off transistor has its base coupled to the control circuit node, its emitter coupled to the second current mirror output and its collector coupled to the base of the switching transistor. Thus, when the diode leakage current rises to a point where the control circuit node drops by one $V_{BE}$, the first normally off transistor turns on and the resulting circuit hysteresis will sharply reduce the potential at the control circuit node. A second hysteresis level is created by passing the current in the third current mirror output through a series of three forward biased diodes. This third clamp level is made equal to the threshold of the on potential of the base of the control transistor. The forward biased diodes are coupled to the emitter of a second normally off transistor which is coupled in parallel with the first normally off transistor. When the first normally off transistor is turned on for the first hysteresis, the control circuit node will rapidly lower to a point where the second normally off transistor will turn on so as to saturate the switching transistor thereby pulling the control circuit node down close to ground potential. This constitutes a second hysteresis level.

It can be seen that the shutdown is determined by the leakage current in a reverse biased diode rather than a forward biased diode voltage drop. Since reverse bias diode leakage is a conventional IC performance limitation it makes a more reliable reference source. This means that the actual IC temperature is more closely related to its shutdown. Also, a high percentage of the total shutdown circuit current drain is associated with the shutdown parameter. The IC operating temperature range can be extended over that associated with an arbitrary temperature limit which must include a tolerance pad.

BRIEF DESCRIPTION OF THE DRAWING

FIG. 1 is a schematic diagram of a typical prior art shutdown circuit.

FIG. 2 is a schematic diagram of the circuit of the invention.

FIG. 3 is a schematic diagram of the current source 27 of FIG. 2.

DESCRIPTION OF THE PRIOR ART

The circuit of FIG. 1 represents the typical prior art approach to thermal shutdown. The circuit is supplied with operating power from a $V_S$ power supply connected + to terminal 10 and − to ground terminal 11. The heart of the circuit is a comparator 12 which has an output terminal 13. This output can operate a shutdown circuit or it can operate some sort of flag circuit that indicates when a temperature limit is exceeded. A reference voltage, $V_{REF}$, is generated in the IC by means not shown and is applied to terminal 14. Resistors 15 and 16 form a voltage divider that establishes a potential at node 17 which is coupled to the inverting input of comparator 12. A current source 18 is powered from terminal 14 and passes a forward current through diode 19. The forward bias voltage drop developed across a PN junction diode is well known to be inversely related to temperature. The typical temperature coefficient is close to −2 mV/°C. At 300° K. the typical voltage drop is on the order of 0.6 volt. Therefore, at 400° K. the voltage drop will fall to 0.4 volt. If the potential at node 17 is made equal to 0.4 volt, the circuit will switch at 400° K. Below 400° K. the output at terminal 13 will be high and above 400° K. the output will go low. Thus, the circuit responds to the temperature sensitive diode 19 and has a predetermined switching point that is determined by the diode characteristic and the potential at node 17. This circuit has several drawbacks. It has a fixed temperature shutdown point, it must draw an appreciable current at all times and it requires $V_{REF}$ to be on during the shutdown. Also, its response is related to the forward voltage drop of a diode and this parameter is not the one that ordinarily limits IC performance.

DESCRIPTION OF THE INVENTION

FIG. 2 is a schematic diagram of the circuit of the invention. The circuit is operated from the $V_S$ supply connected + to terminal 10 and − to ground terminal 11. The heart of the circuit is diode 20 which is biased by one collector of lateral transistor 21 which has four separate collectors. Actually, diode 20 is formed by the IC epitaxial tub into which transistor 21 is fabricated and constitutes the epitaxial tub to isolation diode. The absolute value of the leakage current can be controlled by controlling the epitaxial tub area (diode 20 junction area). In PN junction isolated monolithic silicon IC construction the epitaxial tub is the lateral transistor base. By returning one lateral transistor collector to the base, as shown, the diode leakage current, $I_L$, will flow in that collector. If each of the lateral collectors are of the same size a current equal to $I_L$ will flow in each collector. This means that the circuit responds to the leakage current in a reverse biased PN junction diode and provides three outputs, each of which is a replica of $I_L$. Since diode leakage is the parameter that ordinarily limits the performance of the IC at high temperatures it is the best one for a thermal shutdown reference. This makes the circuit adaptive because, in fabrication, all of the diodes in any particular wafer will receive the same treatment that will determine the reverse bias diode leakage. Those wafers that have high leakage due to their processing will respond and shut down at a lower temperature. This will ensure that the diode leakage in the other circuit elements on that particular wafer will not produce excess currents. However, in those wafers where the leakage is inherently low the circuits can operate successfully at higher temperatures before shutting down. The shutdown temperature will therefore be related to a critical circuit parameter rather than a predetermined temperature.

The circuit shown includes a bias circuit network that develops the bias potentials that are applied to the PNP and NPN transistors in the remainder of the IC. These potentials are developed respectively at terminals 22 and 23.

Transistor 24 conducts $I_1$ to develop the bias potentials across diode-connected transistors 25 and 26. Current source 27 supplies $I_2$ to reverse bias zener diode 28 into its reverse breakdown. The upper collector of transistor supplies a parallel current, $I_3$, to zener diode 28. The base of transistor 24 is pulled up to about 7 volts thereby turning it on. The current flow, $I_1$ will be determined by the value of resistor 29. $I_1$ will be equal to the zener diode 28 voltage, less two diode drops, divided by the value of resistor 29. This bias circuit will operate the IC at its design level and represents the condition of ordinary circuit operation below thermal shutdown where $I_L$ is below the critical value.

Transistor 30, which is connected from the base of transistor 24 and ground, is normally turned off because resistor 31 pulls its base close to ground. In this state the current flowing in the upper collector of transistor 21 is insufficient to pull the base of transistor 30 up to a conduction level. Thus, transistor 30 and resistor 31 form a threshold circuit.

The remainder of the circuit elements form a control function that has a hysteresis characteristic produced as follows. One collector of transistor 21 passes a current equal to $I_L$ through zener diode 32. This develops the zener voltage at the emitter of transistor 33. Since its base is at the zener voltage of diode 28, transistor 33 is normally non-conducting. Another collector of transistor 21 passes a current equal to $I_L$ through diodes 34-36 in the forward direction. Thus, the emitter of transistor 37 is three diode drops (about 1.8 volts at 300° K.) above ground. Since its base is at the zener voltage transistor 37 is also nonconducting. This means that a current equal to $I_L$ is flowing in the fourth collector of transistor 21 also flows in resistor 31. At ordinary temperatures, where $I_L$ is small, the voltage drop across resistor 31 is too small to turn transistor 30 on. However, as the IC temperature rises $I_L$ increases and at some threshold temperature transistor 30 will begin to conduct and pull the potential at the base of transistor 24 down. At some point the potential at the collector of transistor 30 will fall to a level one diode below the emitter of transistor 33 which will begin to conduct. At this point an additional increment of $I_L$ will start to flow in resistor 31. This will sharply pull the collector of transistor 30 further down and represents first hysteresis action. Then when the collector of transistor falls to a level of one diode below the emitter of transistor 37 it too will turn on and contribute still another increment of $I_L$ to the flow of current in resistor 31 thereby creating a second hysteresis action. At this point, the currents flowing into resistor 31 will be sufficient to saturate transistor 30 and its collector potential will fall close to ground potential. This last drop of potential at the base of transistor 24 will turn it completely off and $I_1$ will cease to flow. This means that the PNP bias will rise to $+V_S$ and he NPN bias will fall to ground. This will turn off all of the associated circuitry in the IC.

It can be seen that the built in double hysteresis action will ensure complete shutdown once the above-described threshold level is reached. The first inflection is set by the action of zener diode 32 and the second inflection is determined by diodes 34-36. This second inflection coincides with the conduction threshold of transistor 24.

Once shutdown is achieved the power dissipation in the IC will vanish and it will start to cool down. A reverse sequence will operate as follows. As cooling progresses the value of $I_L$ will decrease. This will decrease the base drive current in transistor 30. Such cooling will progress to a point where transistor 30 comes out of saturation and source 27 will start to pull the collector potential up. When cooling has progressed to a point where the collector potential has risen up to a two diode level transistor 37 will start to turn off thereby reducing the base drive to transistor 30 so that the collector potential will suddenly increase. This will turn transistor 24 on. When the collector of transistor 30 has risen to above one diode below the zener voltage, transistor 33 will start to turn off. At this point when transistor 30 turns off, the collector potential will rise until zener diode 28 conducts and clamps the potential. At this point the bias circuits will be fully on and normal circuit operation is resumed. Assuming that the condition that triggered the original shutdown has cleared, normal operation will continue. However, if the original fault is still present the chip temperature will again rise and initiate another shutdown. In this state the shutdown cycle and recovery will repeat on a time scale determined by the thermal time constant of the IC chip. Such cycling is indicative of a circuit fault that needs attention.

FIG. 3 shows a preferred form of current source 27. The constant current $I_2$ is obtained by means of an N channel junction field effect transistor 38 which has its gate returned to ground. The drain is returned to the $+V_S$ terminal by way of forward biased diode 39. The presence of diode 39 enables $+V_S$ terminal to be pulled below ground potential. without conducting large current during negative transient condition.

Using the circuit of FIG. 3 allows $I_2$ to be turned off when circuit operation is normal. $I_3$ from the upper collector of transistor 25 will bias zener diode 28 into its breakdown thereby holding the circuit, and transistor 24, on. This pulls the source of transistor 38 up so as to pinch it off and reduce $I_2$ to zero. However, when transistor 30 turns on and pulls the base of transistor 24 down, transistor 38 turns on. Both $I_2$ and $I_3$ will then flow in transistor 30 when it is in saturation.

EXAMPLE

The circuit of FIG. 2 was constructed using silicon, monolithic, PN junction isolated, IC parts. The zener diodes were created by diode connecting a conventional NPN transistor as a diode and reverse biasing the emitterbase junction. The following component values were employed:

| COMPONENT | VALUE |
| --- | --- |
| SOURCE 27 | .1 microamperes |
| RESISTOR 31 | 100k ohms |
| RESISTOR 29 | 9 megohms |

The circuit operated to shut down when $I_L$ reached a level of about 2 microamperes. Typically this occurred at a temperature of about 465° K. After shut down the circuit would recover when the $I_L$ level had fallen to about 1 microamperes.

The circuit of the invention has been described and an operating example detailed. When a person skilled in the art reads the foregoing description, alternatives and equivalents, within the spirit and intent of the invention, will be apparent. For example, while the FIG. 2 circuit shows a bias contol circuit being turned off at high temperature, other means of shutdown could be employed. Furthermore, the circuit could include flag means to indicate when the shut down has been invoked. Accordingly, it is intended that the scope of the invention be limited only by the following claims.

I claim:

1. An integrated circuit thermal shutdown circuit comprising:
    a PN junction diode;
    means for applying a reverse bias voltage to said diode wherein said reverse bias is lower than the diode breakdown and said diode conducts a reverse current that is related to the temperature of said integrated circuit;
    means for controlling the power developed in said integrated circuit;
    switch means for operating said means for controlling; and
    hysteresis means responsive to said reverse current and coupled to said switch means whereby said means for controlling is shut down when said reverse current exceeds a predetermined level.

2. The thermal shutdown circuit of claim 1 wherein said switch means has a threshold value which is combined with said hysteresis means to provide a positive acting switching whereby said predetermined level is established.

3. An integrated circuit (IC) thermal shutdown circuit comprising:
    first and second terminals connectable to a source of operating power;
    a first transistor having an emitter-collector circuit coupled to a bias control in said IC for controlling the power therein and a base coupled to a control circuit node;
    first means for clamping the voltage at said node at a level that provides for normal IC operation;
    a PN junction diode;
    current mirror means having an input coupled between said first terminal and said PN junction diode whereby said diode is reverse biased and conducts a reverse leakage current that is related to temperature;
    a second transistor having its emitter coupled to said second terminal, its collector coupled to said control circuit node and a base;
    means for coupling a first output of said current mirror to said base of said second transistor whereby an increasing level of said reverse leakage current will cause said second transistor to conduct and thereby lower the potential at said control circuit node.

4. The circuit of claim 3 further including a third transistor having its base coupled to said control circuit node, its collector coupled to said base of said second transistor and its emitter coupled to a second output of said current mirror and to a second clamping device having a clamping level equal to that of first means for clamping whereby a first hysteresis function is introduced into the operation of said second transistor.

5. The circuit of claim 4 further including a fourth transistor having its base coupled to said control circuit node, its collector coupled to said base of said second transistor and its emitter coupled to a third output of said current mirror and to a third clamping device having a level equal to the threshold level of said first transistor whereby a second hysteresis function is introduced into the operation of said second transistor, 6. The circuit of claim 5 further including a resistor coupled across the base-emitter circuit of said second transistor whereby the switching level of said circuit is determined by the value of said resistor.

* * * * *